(12) United States Patent
Quiané Ruiz et al.

(10) Patent No.: US 10,318,388 B2
(45) Date of Patent: Jun. 11, 2019

(54) DATASETS PROFILING TOOLS, METHODS, AND SYSTEMS

(71) Applicant: Qatar Foundation, Doha (QA)

(72) Inventors: Jorge Arnulfo Quiané Ruiz, Doha (QA); Felix Naumann, Doha (QA); Ziawasch Abedjan, Doha (QA)

(73) Assignee: Qatar Foundation, Doha (QA)

( * ) Notice: Subject to any disclaimer, the term of this patent is extended or adjusted under 35 U.S.C. 154(b) by 537 days.

(21) Appl. No.: 14/894,510

(22) PCT Filed: May 20, 2014

(86) PCT No.: PCT/GB2014/051540
§ 371 (c)(1),
(2) Date: Nov. 28, 2015

(87) PCT Pub. No.: WO2014/191719
PCT Pub. Date: Dec. 4, 2014

(65) Prior Publication Data
US 2016/0139997 A1    May 19, 2016

(30) Foreign Application Priority Data

May 31, 2013 (GB) .................................. 1309796.9
Jun. 3, 2013 (GB) .................................. 1309861.1
(Continued)

(51) Int. Cl.
*G06F 11/14* (2006.01)
*G06F 16/16* (2019.01)
(Continued)

(52) U.S. Cl.
CPC ........ *G06F 11/1453* (2013.01); *G06F 16/162* (2019.01); *G06F 16/1748* (2019.01);
(Continued)

(58) Field of Classification Search
None
See application file for complete search history.

(56) References Cited

U.S. PATENT DOCUMENTS 8,700,577 B2 *   4/2014  Yeh .................... G06F 17/30539
                                                                707/692
9,679,153 B2 *   6/2017  Grube ..................... G06F 21/64
(Continued)

OTHER PUBLICATIONS

Shupeng Han et al, "Discovery of Unique Column Combinations with Hadoop", 2014, Springer, 9 pages.*
(Continued)

*Primary Examiner* — Uyen T Le
(74) *Attorney, Agent, or Firm* — Martin & Ferraro, LLP

(57) ABSTRACT

A dataset profiling tool configured to identify unique and non-unique column combinations in a dataset which includes a plurality of tuples, the tool including: an inserts handler module configured to: receive one or more new tuples for insertion into the dataset, receive one or more minimal uniques and one or more maximal non-uniques for the dataset, identify and group, for each minimal unique, any tuples of the dataset and any of the one or more new tuples which contain duplicate values in the column combinations of the minimal unique, to form grouped tuples which are grouped according to the minimal unique to which the tuples relate, validate the grouped tuples to identify supersets of the minimal uniques for which duplicate values were identified, to generate a new set of one or more minimal uniques and one or more maximal non-uniques, and output the new set of one or more updated minimal uniques and one or more maximal non-uniques.

18 Claims, 2 Drawing Sheets

(30) Foreign Application Priority Data

Figure 1:
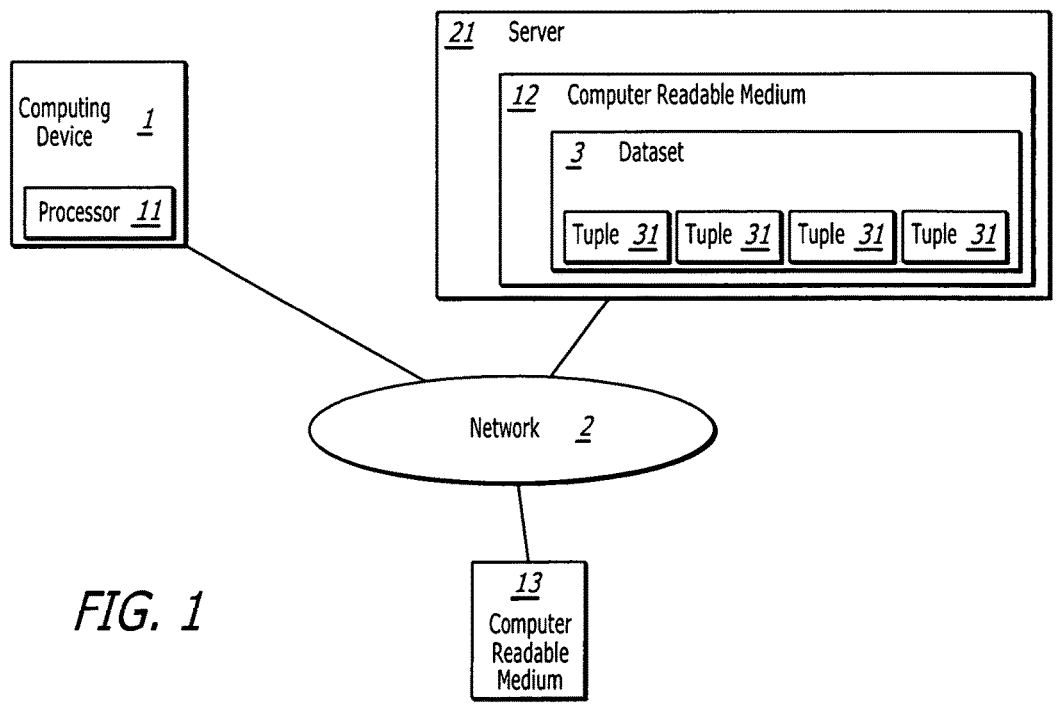

Jul. 20, 2013 (WO) ................ PCT/EP2013/064633
Aug. 20, 2013 (GB) ................................ 1314848.1
Apr. 1, 2014 (GB) ................................ 1405827.5

(51) Int. Cl.
*G06F 16/174* (2019.01)
*G06F 16/22* (2019.01)

(52) U.S. Cl.
CPC ........ *G06F 16/221* (2019.01); *G06F 16/2228* (2019.01); *G06F 16/2291* (2019.01)

(56) References Cited

U.S. PATENT DOCUMENTS

2009/0006392 A1* 1/2009 Chen ................. G06F 17/30536
2013/0091094 A1* 4/2013 Nelke ............... G06F 17/30315
707/610

OTHER PUBLICATIONS

Heise, Arvid et al., "Scalable Discovery of Unique Column Combinations," Proceedings of the VLDB Endowment, vol. 7, No. 4, pp. 301-312, Sep. 1-5, 2014, 12 pgs.

Sismanis, Yannis et al., "GORDIAN: Efficient and Scalable Discovery of Composite Keys," VLDB '06, Sep. 12-15, 2006, pp. 691-702, 12 pgs.

Ziawasch Abedjan et al., "Advancing the Discovery of Unique Column Combinations", Proceedings of the 20th ACM Conference on Information and Knowledge Management, CIKM 2011, 2011, XP002720973, DOI: 10.1145/2063576.2063801, ISBN: 978-1-45-030717-8.

Arvid Heise, "Unique Column Combinations", Apr. 23, 2013, XP002720972, Retrieved from the Internet: URL:http://www.hpi.uni-potsdam.de/fileadmin/hpi/FG_Naumann/folien/SS13/DPDC/DPDC_04_UniqueCoTumnCombination_ArvidHeise.pdf [retrieved on Feb. 21, 2014], pp. 5, 28, and 42-46.

* cited by examiner

DATASETS PROFILING TOOLS, METHODS, AND SYSTEMS

This is a National Phase Application under 35 U.S.C. 371 of PCT/GB2014/051540 filed May 20, 2014 (published on Dec. 4, 2014 as WO 2014/191719); which claims priority to Great Britain Application No. 1405827.5 filed Apr. 1, 2014, Great Britain Application No. 1314848.1 filed Aug. 20, 2013, PCT Application No. PCT/EP2013/064633 filed Jul. 20, 2013, Great Britain Application No. 1309861.1 filed Jun. 3, 2013, and Great Britain Application No. 1309796.9 filed May 31, 2013; all of which are incorporated by reference herein in their entirety.

Embodiments of the present invention relate to dataset profiling tools and methods. In particular, embodiments relate to tools and methods for use in identifying unique column combinations in a dataset.

Large datasets are now common in many different fields, in part due to decreasing data storage costs. Many of these datasets include data which changes at a high rate. Such datasets may include datasets associated with social networking, scientific measurements, and financial transactions. These dynamic datasets present their own challenges.

There is a need to access and analyse large datasets quickly. This poses a particular problem in relation to dynamic datasets because of the rate of change of the data. For example in scientific applications, such as those from bioinformatics and astronomy, scientists have to analyse a huge amount of data produced in daily basis. However, these generated datasets might have completely different patterns from one to another day. Therefore, it is important for scientist to understand such changes in order to query such huge datasets efficiently.

Data profiling is the cornerstone of analytical tasks involving such datasets and at the heart of data profiling is the identification of unique (so called 'uniques') and non-unique (so called 'non-uniques') column combinations. In particular, unique column combinations constitute potential keys for a relational dataset.

Conventional techniques for handling datasets are flawed and/or do not contemplate dynamic datasets.

Aspects of the present invention seek to ameliorate one or more problems associated with the prior art. Specifically, aspects of the present invention seek to provide techniques for determining unique and non-unique column combinations in dynamic datasets.

A first aspect of the present invention provides, a dataset profiling tool configured to identify unique and non-unique column combinations in a dataset which comprises a plurality of tuples, the tool including: an inserts handler module configured to: receive one or more new tuples for insertion into the dataset, receive one or more minimal uniques and one or more maximal non-uniques for the dataset, identify and group, for each minimal unique, any tuples of the dataset and any of the one or more new tuples which contain duplicate values in the column combinations of the minimal unique, to form grouped tuples which are grouped according to the minimal unique to which the tuples relate, validate the grouped tuples to identify supersets of the minimal uniques for which duplicate values were identified, to generate a new set of one or more minimal uniques and one or more maximal non-uniques, and output the new set of one or more updated minimal uniques and one or more maximal non-uniques; and a deletes handler module configured to: add all unique column combinations, defined by the one or more minimal uniques, to a first data structure, for each non-unique column combination, defined by the maximal non-uniques: confirming whether the non-unique column combination will be unique or non-unique after deletion of the one or more tuples for deletion, and if the non-unique column combination is confirmed to be unique after deletion of the one or more tuples for deletion, adding the non-unique column combination to the first data structure, and confirming whether a subset of the non-unique column combination will be unique or non-unique after deletion of the one or more tuples for deletion; and deriving one or more minimal uniques and one or more maximal non-uniques from the first data structure.

The deletes handler module may be further configured such that: if the non-unique column combination is confirmed to be non-unique after deletion of the one or more tuples for deletion, adding the non-unique column combination to a second data structure.

The deletes handler module may be further configured to: identify one or more non-unique column combinations in the second data structure which is a superset of a non-unique column combination to be confirmed as unique or non-unique; and prune the or each identified non-unique column combinations and all of their respective subsets from the non-unique column combinations to be confirmed as unique or non-unique.

The deletes handler module may be further configured to: identify a subset column combinations from a column combination in the first data structure; and reduce the non-unique column combinations to be confirmed as unique or non-unique to all subsets of column combinations which are not a superset of the identified subset of column combinations.

The deletes handler module may be configured to use a position list index in confirming whether the non-unique column combination will be unique or non-unique after deletion of the one or more tuples for deletion, the position list index comprising a list of position lists, wherein each position list contains one or more tuples that correspond to tuples with the same value combination in a column of the dataset.

The identify and group step which the inserts handler module is configured to perform may include: checking a plurality of indexes which at least partially cover the minimal unique.

The plurality of indexes may comprise indexes which each cover a subset of the columns of a minimal unique of the dataset, the subsets being selected according to the columns which appear most frequently in the one or more minimal uniques of the dataset.

The identify and group step which the inserts handler module may be configured to perform includes checking a cache of index look-ups.

The identify and group step which the inserts handler module may be configured to perform includes updating a cache of index look-ups.

The tool may comprise a computer program stored on a tangible computer readable medium.

The tool may form part of a system which includes a network interface which is configured to receive information concerning the dataset for use by the tool.

The tool may be part of a social networking system.

The tool may be part of a financial transaction system.

Another aspect of the present invention provides a system including a tool as above.

Another aspect provides a dataset profiling method to identify unique and non-unique column combinations in a dataset which comprises a plurality of tuples, the method including: receiving one or more new tuples for insertion into the dataset, receiving one or more minimal uniques and one or more maximal non-uniques for the dataset, identifying and grouping, for each minimal unique, any tuples of the dataset and any of the one or more new tuples which contain duplicate values in the column combinations of the minimal unique, to form grouped tuples which are grouped according to the minimal unique to which the tuples relate, validating the grouped tuples to identify supersets of the minimal uniques for which duplicate values were identified, to generate a new set of one or more minimal uniques and one or more maximal non-uniques, and outputting the new set of one or more updated minimal uniques and one or more maximal non-uniques.

Another aspect provides a dataset profiling method to identify unique and non-unique column combinations in a dataset which comprises a plurality of tuples, the method including: adding all unique column combinations, defined by the one or more minimal uniques, to a first data structure, for each non-unique column combination, defined by the maximal non-uniques: confirming whether the non-unique column combination will be unique or non-unique after deletion of the one or more tuples for deletion, and if the non-unique column combination is confirmed to be unique after deletion of the one or more tuples for deletion, adding the non-unique column combination to the first data structure, and confirming whether a subset of the non-unique column combination will be unique or non-unique after deletion of the one or more tuples for deletion; and deriving one or more minimal uniques and one or more maximal non-uniques from the first data structure.

Another aspect provides a dataset profiling method to identify unique and non-unique column combinations in a dataset which comprises a plurality of tuples, the method including: receiving one or more new tuples for insertion into the dataset, receiving one or more minimal uniques and one or more maximal non-uniques for the dataset, identifying and grouping, for each minimal unique, any tuples of the dataset and any of the one or more new tuples which contain duplicate values in the column combinations of the minimal unique, to form grouped tuples which are grouped according to the minimal unique to which the tuples relate, validating the grouped tuples to identify supersets of the minimal uniques for which duplicate values were identified, to generate a new set of one or more minimal uniques and one or more maximal non-uniques, and outputting the new set of one or more updated minimal uniques and one or more maximal non-uniques; and adding all unique column combinations, defined by the one or more minimal uniques, to a first data structure, for each non-unique column combination, defined by the maximal non-uniques: confirming whether the non-unique column combination will be unique or non-unique after deletion of the one or more tuples for deletion, and if the non-unique column combination is confirmed to be unique after deletion of the one or more tuples for deletion, adding the non-unique column combination to the first data structure, and confirming whether a subset of the non-unique column combination will be unique or non-unique after deletion of the one or more tuples for deletion; and deriving one or more minimal uniques and one or more maximal non-uniques from the first data structure Another aspect provides a dataset profiling tool configured to identify unique and non-unique column combinations in a dataset which comprises a plurality of tuples, the tool including: an inserts handler module configured to: receive one or more new tuples for insertion into the dataset, receive one or more minimal uniques and one or more maximal non-uniques for the dataset, identify and group, for each minimal unique, any tuples of the dataset and any of the one or more new tuples which contain duplicate values in the column combinations of the minimal unique, to form grouped tuples which are grouped according to the minimal unique to which the tuples relate, validate the grouped tuples to identify supersets of the minimal uniques for which duplicate values were identified, to generate a new set of one or more minimal uniques and one or more maximal non-uniques, and output the new set of one or more updated minimal uniques and one or more maximal non-uniques.

Another aspect provides a dataset profiling tool configured to identify unique and non-unique column combinations in a dataset which comprises a plurality of tuples, the tool including: a deletes handler module configured to: add all unique column combinations, defined by the one or more minimal uniques, to a first data structure, for each non-unique column combination, defined by the maximal non-uniques: confirming whether the non-unique column combination will be unique or non-unique after deletion of the one or more tuples for deletion, and if the non-unique column combination is confirmed to be unique after deletion of the one or more tuples for deletion, adding the non-unique column combination to the first data structure, and confirming whether a subset of the non-unique column combination will be unique or non-unique after deletion of the one or more tuples for deletion; and deriving one or more minimal uniques and one or more maximal non-uniques from the first data structure.

Figure 2:
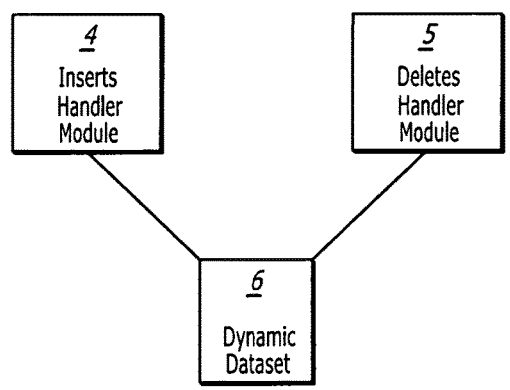
Figure 3:
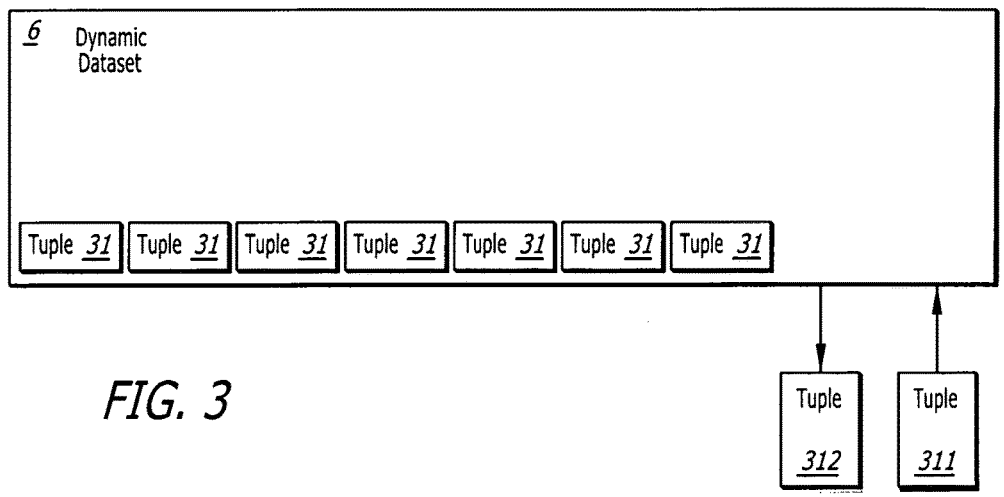
Figure 4:
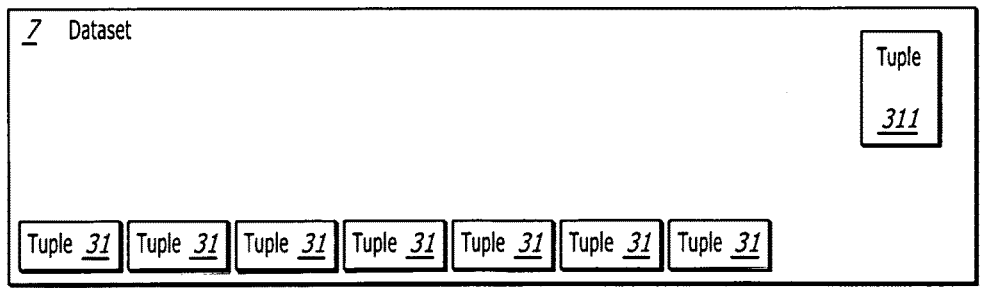

Embodiments off the present invention are described, by way of example, with reference to the accompanying drawings, in which:

FIG. 1 shows a schematic diagram of an embodiment;
FIG. 2 shows a schematic diagram of an embodiment;
FIG. 3 shows a schematic diagram of a dataset of an embodiment; and
FIG. 4 shows a schematic diagram of a dataset of an embodiment.

An embodiment (see FIG. 1) includes a computing device 1. The computing device 1 is configured to perform one or more functions or processes based on instructions which are received by a processor 11 of the computing device 1. The one or more instructions may be stored on a tangible computer readable medium 12 which is part of the computing device 1. In some embodiments, the tangible computer readable medium 12 is remote from the computing device 1 but may be communicatively coupled therewith via a network 2 (such as the internet).

In embodiments, the computing device 1 is configured to perform one or more functions or processes on a dataset 3 (see FIG. 2). The dataset 3 may be stored on the tangible computer readable medium 12 or may be stored on a separate tangible computer readable medium 13 (which, like the tangible computer readable medium 12, may be part of or remote from the computing device 1). The tangible computer readable medium 13 and/or the tangible computer readable medium 12 may comprise an array of storage media. In some embodiments, the tangible computer readable medium 12 and/or the separate tangible computer readable medium 13 may be provided as part of a server 21 which is remote from the computing device 1 (but coupled thereto over the network 2).

The dataset 3 is, in embodiments, a dynamic dataset in that it is subject to frequent changes. The dataset 3 may represent data from a social network, or may represent data relating to financial transactions, for example.

The dataset 3 comprises a plurality of tuples 31 (as will be appreciated).

The one or more instructions, in embodiments of the invention, cause the computing device 1 to perform operations in relation to the dataset 3.

In particular, the one or more instructions may cause the computing device 1 to analyse the dataset 3 to identify one or more unique or non-unique column combinations. The analysis is described below.

In the dataset 3, given a relation R with a relational instance r, a unique column combination (a so called 'unique') is a set of columns K⊆R whose projection on r contains only unique value combinations.

Analogously, in the dataset 3, a set of columns K⊆R is a non-unique column combination (a so called 'non-unique'), if and only if its projection on r contains at least one duplicate value combination.

In other words, a unique and a non-unique may be defined as:

Unique, Uc: A column combination K⊆R is a unique (Uc), iff∀$r_i$, $r_j$∈r, i≠j: $r_i[K]$≠$r_j[K]$ Non-unique, nUc: A column combination K⊆R is a non-unique (nUc), iff∀$r_i$, $r_j$∈r, i≠j : $r_i[K]$=$r_j[K]$ As will be understood, each superset of a unique is also unique while each subset of a non-unique is a non-unique. Therefore, the discovery of minimal uniques and maximal non-uniques (a maximal non-unique being a set of column combinations for which all of its supersets are unique and a minimal unique being a set of column combinations for which all of its subsets are non-unique) allows for the identification all uniques and non-uniques in the dataset 3. Minimal uniques and maximal non-uniques can be defined as:

Minimal Unique, mUc: A column combination K⊆R is a mUc, iff∀K'⊂K: K' is a nUc

Maximal Non-Unique, mnUc: A column combination K⊆R is a mnUc, iff∀K'⊃K: K' is a Uc To discover all minimal uniques and maximal non-uniques of a relational instance, in the worst case scenario, one has to visit all subsets of the given relation, no matter the strategy (breadth-first or depth-first) or direction (bottom-up or top-down). The discovery of all minimal uniques and maximal non-uniques of a relational instance is an NP-hard problem and even the solution set can be exponential. Having a relation instance of size n, there can be $$\binom{n}{\frac{n}{2}} \geq 2^{\frac{n}{2}}$$

minimal uniques, in the worst case, as all combinations of size n/2 can be minimal uniques.

When a dataset 3 changes over time (i.e. it is a dynamic dataset 6 (see FIG. 3) which changes from the original dataset 3 to a new dataset 7 (see FIG. 4)), the set of minimal uniques and maximal non-uniques might change with each change of the dynamic dataset 6.

A new tuple 311 of the dataset 6 might create new duplicates that change existing uniques into non-uniques. One approach may be to detect the new minimal uniques and maximal non-uniques by looking for duplicates on the unique projections. Given a relational instance, r, a new tuple, t', and the original set of minimal uniques, mUcs, one has to check ∀K∈mUcs, if ∃$t_i$∈r|t'[K]=$t_i$[K]. For such changed minimal uniques, one has to start comparing t' and $t_i$ with regard to all K'⊃K.

Analogously, a removed tuple 312, $t_i$, might change existing non-uniques into uniques. Thus, one might check whether existing maximal non-uniques K∈mnUcs are affected by checking whether r[K]\$t_i$[K] still contains duplicate values as defined above: if so, K is still a non-unique; otherwise, one has to check whether subsets of the affected maximal non-uniques are also affected by the removal of $t_i$.

Therefore, updating the existing minimal uniques and maximal non-uniques after a new tuple 311 has been added to, or a tuple 312 has been removed from, the dynamic dataset 6 calls for processing the original dynamic dataset 6 and the revised dynamic dataset 6 (with the inserts and deletes), together.

References herein to the original dynamic dataset 6 are references to the last version of the dynamic dataset 6 for which the uniques are known or substantially known—which, as will be understood, may or may not be the first version of that dynamic dataset 6.

A challenge, therefore, exists in identifying techniques to update the minimal uniques and maximal non-uniques efficiently and within a short period of time and without processing the whole revised dynamic dataset 6.

In some embodiments, an inserts handler module 4 and a deletes handler module 5 are provided. The inserts handler module 4 and deletes handler module 5 may comprise computer readable instructions stored on the tangible computer readable medium 12 and/or separate tangible computer readable medium 13. The data structures which are used and/or created by the inserts handler module 4 and the deletes handler module 5 may, equally, be stored on the tangible computer readable medium 12 and/or the separate tangible computer readable medium 13.

The operation of the inserts handler module 4 and deletes handler module 5 are described below.

It is assumed that the dynamic dataset 6 exists and an original version of the dynamic dataset 6 has been analysed by computing device 1 to identify the minimal uniques and maximal non-uniques of the dynamic dataset 6. The analysis of the dynamic dataset 6 can be performed according to a conventional method—such as that described in A. Heise, J.-A. Quian'e-Ruiz, Z. Abedjan, A. Jentzsch, and F. Naumann. Scalable Discovery of Unique Column Combinations. PVLDB, 7(4), 2013; or Y. Sismanis, P. Brown, P. J. Haas, and B. Reinwald. Gordian: Efficient and Scalable Discovery of Composite Keys. In VLDB, pages 691-702, 2006.

The minimal uniques and maximal non-uniques are stored, in embodiments, on a data structure which is accessible by both the inserts handler module 4 and the deletes handler module 5. In some embodiments, identifiers for the minimal uniques and maximal non-uniques are stored in the data structure. The identifiers may be stored in association with the dynamic dataset 6.

The inserts handler module 4 is configured to receive as input a set of one or more new, inserted, tuples 311 for the dynamic dataset 6. In some embodiments, the inserts handler module 4 may receive an indicator of a storage location at which the or each inserted tuples 311 can be located. The inserts handler module 4 is configured to check all of the previously identified minimal uniques for uniqueness, and to find any new minimal uniques and maximal non-uniques. The stored minimal uniques and maximal non-uniques (or their identifiers, if applicable) are updated accordingly with revised minimal uniques and maximal non-uniques. These may be stored in a data structure which is communicatively coupled to both the inserts handler module 4 and the deletes handler module 5.

Analogously, the deletes handler module 5 is configured to receive as input a set of one or more deleted tuples 312. The deletes handler module 5 is configured to search for duplicates in all of the previously identified maximal non-uniques, and to find any new minimal uniques and maximal non-uniques. The stored minimal uniques and maximal non-uniques (or their identifiers, if applicable) are updated accordingly with revised minimal uniques and maximal non-uniques (e.g. in the data structure).

The storing of minimal uniques and maximal non-uniques may be undertaken by the inserts handler module 4 and/or the deletes handler module 5 and/or a read/write module (not shown) which is communicatively coupled to the inserts handler module 4, the deletes handler module 5 and the data structure. The data structure may be stored on repository which may be provided on the tangible computer readable medium 12 or the separate tangible computer readable medium 13.

In more detail of some embodiments, the inserts handler module 4 may be configured to perform the following workflow:

---
Algorithm 1: HandleInserts( )
---
Data: Inserted tuples T, MNUCS, and MUCS
Result: New MNUCS and MUCS
1  releventLookUps ← new Map;
2  for U ∈ MUCS do
3  |   tupleIds ← retrieveIDs(U, T);
4  |   if !tupleIds.isEmpty( ) then
5  |   |_  relevantLookUps.put(U, tupleIds);
   |_
6  tuples ← sparseIdx.retrieveTuples(relevantLookUps);
7  dManager ← new DuplicateManager(tuples, T);
9  return findNewUniques(dManager, MUCS, MNUCS);
---

Input parameters of the workflow include the previously determined minimal uniques, the previously determined maximal non-uniques, and the set of one or more newly inserted tuples, T, 311.

According to the workflow of some embodiments, the previously determined minimal uniques and maximal non-uniques are obtained according to a conventional approach as described above. In some embodiments, this conventional approach forms part of the present invention (instructions for which may be stored on the tangible computer readable medium 12 or separate tangible computer readable medium 13). The minimal uniques and maximal non-uniques may be determined when the dynamic dataset 6 is first analysed by the computing device 1.

The workflow for the inserts handler module 4 may, in some embodiments, begin by comparing the set of one or more newly inserted tuples 311 to the original dynamic dataset 6. In some embodiments, this may comprise, for each previously determined minimal unique, retrieving all tuples 31 (or identifiers for those tuples 31) that might now contain duplicate values (Line 3). If no tuples 31 (or identifiers for those tuples 31) are retrieved for a given minimal unique, then it is concluded that the newly inserted set of one or more tuples 311 does not create any duplicate for that minimal unique. Therefore, the column combination is still a minimal unique. If one or more tuples 31 (or identifiers for those tuples 31) are retrieved, however, then the inserts handler module 4 may store the one or more retrieved tuples 31 (or identifiers therefor) along with the minimal unique in a data structure, relevantLookUp, for later analysis (Line 5).

As all other tuples 31 contain distinct values for the current minimal unique, the projection of any superset of the minimal unique will be unique on those tuples 31. Accordingly, the inserts handler module 4 may analyse only the tuples 31 that might include duplicates for the each minimal unique.

In some embodiments, depending on an index structure used by the retrieveIDs function above, the tuples 31 (or identifiers for those tuples 31) might also correspond to tuples 31 with partial duplicates with regard to the minimal unique. Those tuples 31 are discarded by the inserts handler module 4 once identified.

After analysis of all previously determined minimal uniques, all relevant tuples 31 (or identifiers) will have been collected by the inserts handler module 4.

The inserts handler module 4 is then configured, in some embodiments in which tuple 31 identifiers have been collected, to compute a union of all of the identifiers for those tuples 31 with the tuples 31 themselves and to retrieve the tuples 31. This retrieval may be in one run of all relevant tuples 31 and may be by a mix of random accesses and sequential scans of the original dataset 3. In some embodiments, a sparse index may be used which maps a tuple identifier to a byte offset where the tuple 31 resides in the dynamic dataset 6 (Line 6).

In some embodiments, the inserts handler module 4 uses a duplicate manager, dManager, to group the retrieved tuples 31 and inserted tuples 311 in accordance with corresponding minimal uniques (Line 7). The inserts handler module 4 may be further configured to define, in some embodiments, a duplicate group as a set of tuples 31 that have the same value combination when projecting the corresponding minimal unique.

In embodiments, the inserts handler module 4 is configured to discover the new minimal uniques in the last step, findNewUniques, of the above workflow using the duplicate groups.

If a new minimal unique exists then it must be a superset of the previously identified minimal uniques for the dynamic dataset 6 before the insertion of the new tuple 311. Accordingly, when a minimal unique becomes non-unique because of an inserted tuple 311, all supersets of that minimal unique should be checked to verify their uniqueness.

Because all of the tuples 31 which are not in the duplicate groups must contain unique values for the minimal unique, only the tuples 31 of the duplicate groups need to be checked (or 'validated').

There are several challenges which are encountered in this checking process (otherwise known as verification). Embodiments of the inserts handler module 4 use an index-based approach to identify duplicates among the inserted tuples 311 and tuples 31. The workflow of this approach is generally shown below:

---
Algorithm 2: RetrieveIDs( )
---
Data: Inserted tuples T, minimal unique U
Result: tupleIds
1  CC ← getLargestCachedSubset(U));
2  lookUpResults ← new List;
3  if !CC.isEmpty( ) then
4  |   lookUpResults = tupleIdCache.get(CC);
5  |   if lookUpResults.isEmpty( ) then
6  |   |_  return lookUpResults;
   |_
7  indexes ← getIndexes(U \ CC);
8  for idx ∈ indexes do
9  |   CC.add(idx.getCC( ));
10 |   if lookUpResults.isEmpty( ) then
11 |   |_  lookUpResults ← idx.lookUpIds([T]);

| Algorithm 2: RetrieveIDs( ) |
| --- |
| 12        else
13            lookUpResults ←
                idx.lookUpAndIntersectIds(lookUpResults);
14        cache(CC, lookUpResults);
15        if lookUpResults.isEmpty( ) then
16            return lookUpResults;
17    return lookUpResults: |

This process receives a minimal unique, U, of the original dynamic dataset 6 and newly inserted tuples 311 as inputs. In some embodiments, a minimal unique is only partially covered by an index of the inserts handler module 4 and in some embodiments the minimal unique is covered by a plurality of indexes which may be disjointed indexes (which collectively cover the minimal unique). In some embodiments, results from lookups involving multiple indexes are intersected for a single minimal unique. It may be that the inserts handler module 4 makes a plurality of lookups to the same index for multiple minimal uniques. Accordingly, results may be cached and the cache accessed for subsequent look-ups. The cache may be a data structure, as discussed above.

With this in mind, the above workflow begins, in some embodiments, with a check to see if the lookup of a subset, CC, of the minimal uniques of the original dynamic dataset 6 has been made before—which may allow the use of cached results (Line 4). An empty cached lookup result indicates that the minimal unique, U, is still unique and so the uniqueness check for that minimal unique can be terminated.

Otherwise, all of the indexes that cover the minimal unique, U, are collected apart from the cached indexes of CC. For each index, idx, the associated column combinations are added to the cached indexes CC. If there are no cached results then the process moves on using the first index which covered U (Line 11).

The inserts handler module 4 may, in some embodiments, be configured to group the inserted tuples 311 by distinct value projections of idx.getCC( )to reduce the likelihood of multiple scans of the tuples 31 and unnecessary lookups.

If the result of lookUpResults is not empty then the inserts handler module 4 may be configured to perform a modified lookup on the index such that an intersection is simulated by considering only those projections of idex.getCC( ) on the inserted tuples, T, that were included in previous lookup results. The inserts handler module 4 is configured then to store accumulated index columns in the cache CC along with the corresponding results. If the lookup results are empty, then an empty set of lookUpResults may be returned, otherwise the inserts handler module 4 is configured to move onto the next index, idx. The inserts handler module 4 is configured to complete this task, at the latest, when the last non-empty set of lookUpResults has been returned and all relevant indexes for the minimal unique have been used.

The inserts handler module 4, in embodiments, is configured to use indexes of a small subset of columns of the dynamic dataset 6 so that all minimal uniques are covered by at least one index of the inserts event handler 4. A high frequency of occurrence of a column among the minimal uniques indicates that the column has many unique values—as columns with many distinct values will occur in many minimal uniques.

In some embodiments, the indexes of the inserts handler module 4 may only cover a subset of the minimal uniques. Therefore, the tuple identifiers retrieved by these indexes may only be partial duplicates with the projections on the newly inserted tuples 311.

Therefore, after the tuples 31 corresponding with the identifiers have been retrieved by the inserts handler module 4, the duplicate groups may be checked by verifying the values in the columns without use of the indexes.

The workflow which may be implemented, according to some embodiments, by the inserts event handler 4 for indexing based on a given set of minimal uniques mUcs and corresponding values in the relation, R, is shown below:

| Algorithm 3: SelectIndexAttributes( ) |
| --- |
| Data: MUCS, relation R
Result: Columns to be indexed K
1    frequencies ← new Map;
2    for C ∈ R do
3        frequencies.put(C, getFrequeney(C, MUCS));
4    $C_f$ ← frequencies.getMostFrequentColumn( ));
5    K.add($C_f$);
6    remainingMUCS ← MUCS \{U\|U ∈ MUCS ∧ $C_f$ ∈ U};
7    while !remainingMUCS.isEmpty do
8        frequencies.clear( );
9        for C ∈ R do
10            frequencies.put(C, getFrequency(C,
                remainingMUCS));
11       $C_f$ ← frequencies.getMostFrequentColumn( ));
12       K.add($C_f$); |

The workflow begins with inserts handler module 4 determining the frequency of the appearance of each column in the minimal uniques.

The most commonly appearing column, $C_f$, is added (by the inserts handler module 4) to a set, K, of columns to be indexed. The next column to be added to the set K is determined by excluding all minimal uniques that contain $C_f$ (the most commonly appearing column), and then determining the most frequently occurring column from that group. This is repeated by excluding all minimal uniques that contain the column which was last added to the set K until all minimal uniques have been covered by at least one of the columns in the set K.

In some embodiments, the inserts handler module 4 is configured to use additional indexes than just those described above with a view to reducing the number of tuples 31 which must be retrieved. The workflow for the selection of additional indexes is shown below:

| Algorithm 4: addAdditionalIndexAttributes( ) |
| --- |
| Data: MUCS, relation R, initial index columns K, quota δ
Result: Columns to be indexed K
1    $I_K$ ← createIndexes(K);
2    coveringIndexes ← new Map;
3    solutions ← new Map;
4    for C ∈ K do
5       containingMUCS
         ← {U \ {C} : U ∈ MUCS ∧ (U ∩ K) == {C}};
6       $K_C$ ← selectIndexAttributes(containingMUCS.R);
7       if \|$K_C$\| ≤ δ then
8          coveringIndexes.put(C, $K_C$):
9    for combination $C_1, C_2, ..C_k$ ∈ coveringIndexes.keySet( )
      do
10      if \|$K_{C_1}$ ∪ $K_{C_2}$.. ∪ $K_{C_k}$\| ≤ δ then
11          solutions.put($C_1$ ∪ $C_2$, .. ∪ $C_k$, $K_{C_1}$ ∪ $K_{C_2}$ .. ∪ $K_{C_k}$);
12    solutions.removeRedundantCombinations( ); |

-continued

| Algorithm 4: addAdditionalIndexAttributes( ) |
|---|
| 13  $K_0 \leftarrow$ combWithLowestSelectivity(solutions.keySet( ), $I_K$);
14  K.add(solutions.get($K_0$));
15  return K; |

The inserts handler module 4 is configured to receive a user defined quota, δ for the number of columns to be indexed.

For each column C∈K, the inserts handler module 4 seeks the best possibility to cover that column from among all of the minimal uniques without exceeding the quota δ>|K|.

In some embodiments, the inserts handler module 4, is configured to apply Algorithm 3 above to a modified set of minimal uniques which comprises all minimal uniques that contain column C, but no other indexed column. Column C itself is excluded from the operation of the function selectIndexAttributes in Line 6 because this function generates the smallest set of columns that cover all of the modified list of minimal uniques—as column C covers all of those minimal uniques.

The inserts handler module 4 of some embodiments, may then generate all possible combinations of columns $C_1, C_2, \ldots C_k \in K$ that can be covered by a set covering attributes and creates a union of the corresponding covering attributes $K_{C1}, K_{C2}, \ldots K_{Ck}$. If the size of the union is less than the quota, δ, then the solution may be stored (e.g. a data structure) (Line 11).

The inserts handler module 4 of some embodiments, may select the solution from the stored solutions which cover the least selective combination $C_1, C_2, \ldots C_k$.

Selectivity, $s(C_i)$, of an index, $I_{ci}$, on a relational instance, r, may be defined as:

$$s(C_i) = \frac{\text{cardinality}(C_i)}{|r|}$$

The cardinality of a column denotes the number of distinct values in that column. As such, a primary key column has a cardinality of |r| and a selectivity of 1.

To identify the selectivity of the set of columns $C_1, C_2, \ldots C_k \in K$, the inserts handler module 4 may use the following, that corresponds to union probability:

$$s(C_1, C_2, \ldots C_k) = 1 - ((1-s(C_1)) \cdot (1-s(C_2)) \cdot \ldots \cdot (1-s(C_k)))$$

After several tuple 311 inserts into the dynamic dataset 6, the indices need to be updated by the addition of the new values and row identifiers. If an index contains the new value, the identifier of the tuple 311 is appended to an identifier of the value—else a new key-value-pair is created.

New indexes are not needed for each newly inserted tuple 311 or batch of tuples 311. However, the deletion of a tuple 312 would require the index selection approach detailed above to be rerun.

The inserts handler module 4, finally, may be configured to identify the new possible minimal uniques and maximal non-uniques. This is done, in embodiments, by use of the tuples 31 which form the duplicate groups and the previously determined minimal uniques and maximal non-uniques from the original dataset 3.

The workflow for an embodiment of this process is shown below:

| Algorithm 5: findNewUniques( ) |
|---|
| Data: duplicate manager dManager, MUCS, MNUCS
Result: New MUCS and MNUCS
1   for U : MUCS do
2      groups ← dManager.getGroups(U);
3      removePartialDuplicates(groups);
4      if groups.isEmpty then
5         newUniques.add(U) ;
6         continue ;
7      candidates ← new List ;
8      for C ∈ R \ U do
9         candidates.add(U ∪ (C));
10     for group : groups do
11        for K ∈ candidates do
12           candidates.remove(K);
13           while !isUnique(K) ∧ K ≠ R do
14              MNUCS.add(K);
15              C ← takeCol(R \ K);
16              K ← check(K ∪ C, group);
17           if K = R then
18              go to line 23
19           candidates.add(K);
20        removeRedundant(candidates);
21     newUniques.addAll(candidates) ;
22  MUCS ← newUniques;;
23  removeRedundant(MNUCS.MUCS);
24  return (MUCS,MNUCS) ; |

In embodiments, for each of the uniques, U, from the original dynamic dataset 6, the duplicate groups are retrieved (Line 2) and all partial duplicates are removed from those duplicate groups (Line 3).

Thus, for uniques that did not change, the duplicate groups are empty, so these are added to the newUniques list. For the remainder, U is non-unique and so supersets are generated by adding single columns to the combination U (Lines 8 and 9). For each duplicate group, the inserts handler module 4 checks whether the candidates are, in fact, unique. If not, the inserts handler module 4 is configured to expand the candidate with new columns and change the set of candidates in the next duplicate group too (Line 11).

Having now processed all previous minimal uniques, the inserts handler module 4 is configured, in some embodiments, to simplify the sets of newly discovered minimal uniques and maximal non-uniques, to remove redundant supersets and subsets respectively (Line 23).

In more detail of some embodiments, the deletes handler module 5 may be configured to perform the following workflow:

| Algorithm 6: HandleDeletes( ) |
|---|
| Data: Relation R, Ids of Deleted Tuples D, MNUCS, and MUCS
Result: New MNUCS and MUCS
1   UGraph ← empty graph; NUGraph ← empty graph; for U ∈ MUCS do
2      UGraph.add(U);
3   for NU ∈ MNUCS do
4      if isStillNonUnique(NU, D) then
5         NUGraph.add(NU);
6      else
7         UGraph.add(U);
8         checkRecursively(NU, D, UGraph, NUGraph);
9   MUCS ← UGraph.getminimalUniques( );
10  MNUCS ← UGraph.getmaximalUniques( );
11  return (MUCS,MNUCS); |

In contrast to the workflow followed by the inserts handler module 4, the deletes handler module 5 is configured to identify changes in the non-uniques following the deletion of one or more tuples 31.

Accordingly, the deletes handler module 5 is configured to store all minimal uniques into a data structure, UGraph (unique graph) (Line 2).

In some embodiments, the deletes handler module 5 is configured to store all maximal non-uniques into a data structure, NUGraph (non-unique graph).

The data structures UGraph and NUGraph may be used by some embodiments of the deletes handler module 5 to omit redundant combinations when a new minimal unique or maximal non-unique is discovered.

A mapping of columns of the dynamic dataset 6 to column combinations enables the relatively fast discovery of previously discovered redundant combinations by the deletes handler module 5. Because all non-uniques of a relation are subsumed by the set of maximal non-uniques, the deletes handler module 5 is configured to start the analysis on the maximal non-uniques set.

If a maximal non-unique stays non-unique, all of its subsets will also stay non-unique. In that case, the deletes handler module 5 is configured to add the column combination, NU, to NUGraph (Line 5). If the column combination turns out to be a new unique, the deletes handler module 5 is configured to add the column combination, U, to UGraph.

Then, the deletes handler module 5 of some embodiments is configured to check whether any other subset of non-unique column combinations has been turned into a unique combination. The deletes handler module 5 may be configured to check, recursively, in a depth-first manner all subsets of non-unique column combinations and to store any intermediate unique and non-unique discoveries in UGraph and NUGraph, respectively.

As maximal non-uniques may have overlaps in their subsets, the deletes handler module 5 may also be configured to use the UGraph and NUGraph data structures to avoid unnecessary non-uniqueness checks.

If NUGraph contains a superset of a column combination to be checked, the deletes handler module 5 may be configured to prune the column combination and all of its subsets. If UGraph contains a subset $K \subset NU$, the deletes handler module 5 may be configured to reduce the search space to all subsets $K' \subseteq NU$ where $K'$ is not a superset of K.

To identify whether a previous non-unique, N, combination on a relation instance r is still a non-unique, it is necessary to determine whether r'[N], with $r' = r \backslash D$ or $r' = r \backslash d$ (where d is the deleted tuple and D is the deleted tuples in the event of multiple deletions), still contains a duplicate value or not.

In other words, it needs to be determined whether the tuple 312 deletion has removed all duplicates from r'[N] or not.

One technique would be to follow a sort-based or hash-based approach to discover duplicates in r'[N]. This technique may, however, lead to a full scan of r'. Furthermore, if N turns into a unique the complete duplicate detection approach must be repeated for all subsets $N' \subset N$ with $|N'|=|N|-1$.

In embodiments, the deletes handler module 5 is configured to perform a search within the duplicate groups in N, only. The deletes handing module 5 may use inverted indexes known as position list indexes (PLI) per column.

A PLI for a column combination K is a list of position lists, wherein each position list contains tuple identifiers that correspond to tuples 31 with the same value combination in K.

The PLIs may be determined by the deletes handler module 5 at any one of several different junctures. For example, the deletes handler module 5 may create the PLIs during an initial scan of the dynamic dataset 6.

The PLIs are, as will be appreciated, smaller than the columns because they only store identifiers for tuples 31 that have values which appear more than once. To obtain a PLI for a column combination K, a cross-intersection of the PLIs of all the columns $C \in K$ is determined. For the PLI of a non-unique K there will be at least one position list with a duplicate pair.

When a tuple 312 is deleted, the deletes handler module 5 is configured to remove the identifiers for the deleted tuple 312 from the PLI. Therefore, if a PL includes only one identifier it no longer forms part of the PLI. As such, to see if K remains non-unique the deletes handler module 5 may be configured to check to see if there are any corresponding PLs for K.

In some embodiments, a complete intersection of PLIs is not required. For example, if a deleted tuple 312 contains a unique value for a column $C \in K$, deletion of that tuple 312 will not affect the PLI of K. In some embodiments, the deletes handler module 5 is configured to identify those PLIs that contained the deleted tuple(s) 312 and to reduce the intersection to those relevant PLIs before removing the identifiers of the deleted tuple(s) 312. Non-uniqueness can be confirmed if the intersection of all relevant PLIs per column results in an empty set of PLIs. The removed tuple(s) 312 did not affect the duplicates in K. If the result contains some PLIs, the deletes handler module 5 checks whether they contain the identifiers of removed tuple(s) 312. If any of the PLIs contain at least two identifiers that do not correspond to the set of deleted tuple(s) 312 then non-uniqueness is confirmed. Otherwise, the removal of the tuple(s) 312 has affected a set of duplicates in K and a complete check of the PLI of K is performed by the deletes handler module 5.

Embodiments of the invention seek to provide data structures and methods to seek to (i) check column combinations for uniqueness and non-uniqueness quickly, (ii) avoid full scans when looking for duplicates, (iii) reduce the amount the data to fetch from a storage medium, and (iv) speed up the search for new uniques and non-uniques.

Embodiments of the present invention may be used in the analysis of numerous different types of dynamic dataset 6 including, but not limited, to social networking data, scientific data, financial data, data associated with clouding computing service providers, search engine data, tax data, statistical data, and the like.

It can be seen that improved identification of the uniques in a dynamic dataset 6 can allow for faster and better indexing of that dynamic dataset 6. Therefore, embodiments of the present invention further include systems for generating an index of the dynamic dataset 6 based on the uniques identified using the methods and systems described above. Embodiments may also include systems which perform searches or organisation of the dynamic dataset 6 using the uniques identified using the methods and systems described above.

In embodiments, the inserts handler module 4 may be provided without the deletes handler module 5, and vice versa. As will be appreciated, embodiments include a data profiling tool which includes one or both of the inserts handler module 4 and the deletes handler module 5, as well as corresponding data profiling methods.

Embodiments of the present invention also encompass systems incorporating such tools. The systems may include a database stored on a tangible computer readable medium which is coupled to the tool or tools by a communicative coupling (such as a computer network (e.g. the internet or a local area network)). The system may, therefore, include a network interface.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A dataset profiling tool configured to identify unique and non-unique column combinations in a dataset which comprises a plurality of tuples, the tool comprising:
 a processor configured to:
  receive one or more new tuples inserted into the dataset,
  receive one or more stored minimal uniques and one or more stored maximal non-uniques for the dataset,
  identify and group, for each minimal unique, any tuples of the dataset and any of the one or more new tuples which contain duplicate values in the column combinations of the minimal unique, to form grouped tuples which are grouped according to the minimal unique to which the tuples relate,
  validate the grouped tuples to identify supersets of the minimal uniques for which duplicate values were identified and to generate a new set of one or more updated minimal uniques and one or more maximal non-uniques,
  output the new set of the one or more updated minimal uniques and one or more maximal non-uniques;
  add all unique column combinations, defined by the one or more updated minimal uniques, to a first data structure,
  for each non-unique column combination, defined by the maximal non-uniques:
   confirm whether the non-unique column combination will be unique or non-unique after deletion of at least one tuple of the plurality of the tuples in the dataset,
   if the non-unique column combination is confirmed to be unique after the deletion of the at least one tuple of the plurality of the tuples in the dataset, add the non-unique column combination to the first data structure, and confirm whether a subset of the non-unique column combination will be unique or non-unique after the deletion of the at least one tuple of the plurality of the tuples in the dataset; and
   derive one or more minimal uniques and one or more maximal non-uniques from the first data structure.

2. The tool according to claim 1, wherein the processor is further configured to:
 add, if the non-unique column combination is confirmed to be non-unique after the deletion of the at least one tuple of the plurality of the tuples in the dataset, the non-unique column combination to a second data structure.

3. The tool according to claim 1, wherein the processor is further configured to:
 add, if the non-unique column combination is confirmed to be non-unique after the deletion of the at least one tuple of the plurality of the tuples in the dataset, the non-unique column combination to a second data structure;
 identify one or more non-unique column combinations in the second data structure which is a superset of a non-unique column combination to be confirmed as unique or non-unique; and
 prune each of the identified non-unique column combinations and all of their respective subsets from the non-unique column combinations to be confirmed as unique or non-unique.

4. The tool according to claim 1, wherein the processor is further configured to:
 identify a subset column combinations from a column combination in the first data structure; and
 reduce the non-unique column combinations to be confirmed as unique or non-unique to all subsets of column combinations which are not a superset of the identified subset of column combinations.

5. The tool according to claim 1, wherein the processor is configured to use a position list index in confirming whether the non-unique column combination will be unique or non-unique after the deletion of the at least one tuple of the plurality tuples in the dataset, the position list index comprising a list of position lists, wherein each position list contains one or more tuples that correspond to tuples with the same value combination in a column of the dataset.

6. The tool according to claim 1, wherein the processor is further configured to
 check a plurality of indexes which at least partially cover the minimal unique.

7. The tool according to claim 1, wherein the processor is further configured to
 check a plurality of indexes which at least partially cover the minimal unique and the plurality of indexes comprises indexes which each cover a subset of the columns of a minimal unique of the dataset, the subsets being selected according to the columns which appear most frequently in the one or more minimal uniques of the dataset.

8. The tool according to claim 1, wherein the processor is further configured to
 check a plurality of indexes which at least partially cover the minimal unique and checking a cache of index look-ups.

9. The tool according to claim 1, wherein the processor is further configured to
 check a plurality of indexes which at least partially cover the minimal unique and updating a cache of index look-ups.

10. The tool according to claim 1, wherein the tool comprises a computer program stored on a tangible computer readable medium.

11. The tool according to claim 1, wherein the tool forms part of a system which includes a network interface which is configured to receive information concerning the dataset for use by the tool.

12. The tool according to claim 1, wherein the tool is part of a social networking system.

13. The tool according to claim 1, wherein the tool is part of a financial transaction system.

14. A dataset profiling tool configured to identify unique and non-unique column combinations in a dataset which comprises a plurality of tuples, the tool comprising:

a processor configured to:
- add all unique column combinations, defined by one or more minimal uniques, to a first data structure,
- for each non-unique column combination, defined by the maximal non-uniques:
  - confirm whether the non-unique column combination will be unique or non-unique after deletion of at least one of the plurality of tuples in the dataset, and
  - if the non-unique column combination is confirmed to be unique after the deletion of the at least one tuple of the plurality of tuples in the dataset, add the non-unique column combination to the first data structure, and confirm whether a subset of the non-unique column combination will be unique or non-unique after the deletion of the at least one tuple of the plurality of tuples in the dataset; and
  - derive one or more minimal uniques and one or more maximal non-uniques from the first data structure.

15. A dataset profiling method to identify unique and non-unique column combinations in a dataset which comprises a plurality of tuples, the method comprising:
- receiving one or more new tuples inserted into the dataset,
- receiving one or more stored minimal uniques and one or more stored maximal non-uniques for the dataset,
- identifying and grouping, for each minimal unique, any tuples of the dataset and any of the one or more new tuples which contain duplicate values in the column combinations of the minimal unique, to form grouped tuples which are grouped according to the minimal unique to which the tuples relate,
- validating the grouped tuples to identify supersets of the minimal uniques for which duplicate values were identified and to generate a new set of one or more updated minimal uniques and one or more maximal non-uniques, and
- outputting the new set of the one or more updated minimal uniques and one or more maximal non-uniques.

16. A dataset profiling method to identify unique and non-unique column combinations in a dataset which comprises a plurality of tuples, the method comprising:
- adding all unique column combinations, defined by one or more minimal uniques, to a first data structure,
- for each non-unique column combination, defined by the maximal non-uniques:
  - confirming whether the non-unique column combination will be unique or non-unique after deletion of at least one tuple of the plurality of the tuples in the dataset, and
  - if the non-unique column combination is confirmed to be unique after the deletion of the at least one tuple of the plurality of the tuples in the dataset, adding the non-unique column combination to the first data structure, and confirming whether a subset of the non-unique column combination will be unique or non-unique after the deletion of the at least one tuple of the plurality of the tuples in the dataset; and
- deriving one or more minimal uniques and one or maximal non-uniques from the first data structure.

17. A dataset profiling method to identify unique and non-unique column combinations in a dataset which comprises a plurality of tuples, the method comprising:
- receiving one or more new tuples inserted into the dataset,
- receiving one or more stored minimal uniques and one or more stored maximal non-uniques for the dataset,
- identifying and grouping, for each minimal unique, any tuples of the dataset and any of the one or more new tuples which contain duplicate values in the column combinations of the minimal unique, to form grouped tuples which are grouped according to the minimal unique to which the tuples relate,
- validating the grouped tuples to identify supersets of the minimal uniques for which duplicate values were identified and to generate a new set of one or more updated minimal uniques and one or more maximal non-uniques,
- outputting the new set of the one or more updated minimal uniques and one or more maximal non-uniques;
- adding all unique column combinations, defined by the one or more minimal uniques, to a first data structure,
- for each non-unique column combination, defined by the maximal non-uniques:
  - confirming whether the non-unique column combination will be unique or non-unique after deletion of at least one tuple of the plurality of tuples in the dataset, and
  - if the non-unique column combination is confirmed to be unique after the deletion of the at least one of the plurality of tuples in the dataset, adding the non-unique column combination to the first data structure, and confirming whether a subset of the non-unique column combination will be unique or non-unique after the deletion of the at least one tuple of the plurality of tuples in the dataset; and
  - deriving one or more minimal uniques and one or more maximal non-uniques from the first data structure.

18. A dataset profiling tool configured to identify unique and non-unique column combinations in a dataset which comprises a plurality of tuples, the tool comprising:
a processor configured to:
- receive one or more new tuples inserted into the dataset,
- receive one or more stored minimal uniques and one or more stored maximal non-uniques for the dataset,
- identify and group, for each minimal unique, any tuples of the dataset and any of the one or more new tuples which contain duplicate values in the column combinations of the minimal unique, to form grouped tuples which are grouped according to the minimal unique to which the tuples relate,
- validate the grouped tuples to identify supersets of the minimal uniques for which duplicate values were identified and to generate a new set of one or more updated minimal uniques and one or more maximal non-uniques, and
- output the new set of the one or more updated minimal uniques and one or more maximal non-uniques.

* * * * *